J. FARGUSSON.
Grain Winnower.

No. 33,639.

3 Sheets—Sheet 1.

Patented Nov. 5, 1861.

Witnesses:
R. L. Cobbs
H. J. Mann

Inventor:
J. Fargusson
by
Robt W. Fenwick
De Witt C. Lawrence
his Attys

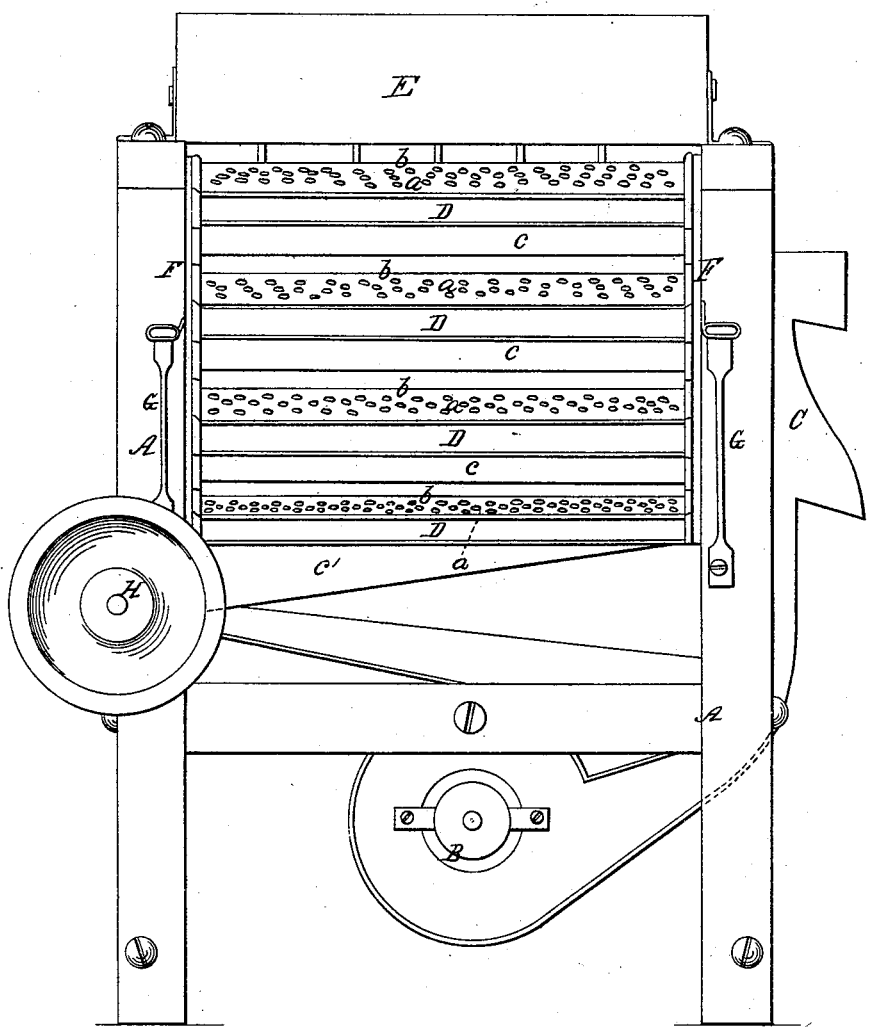

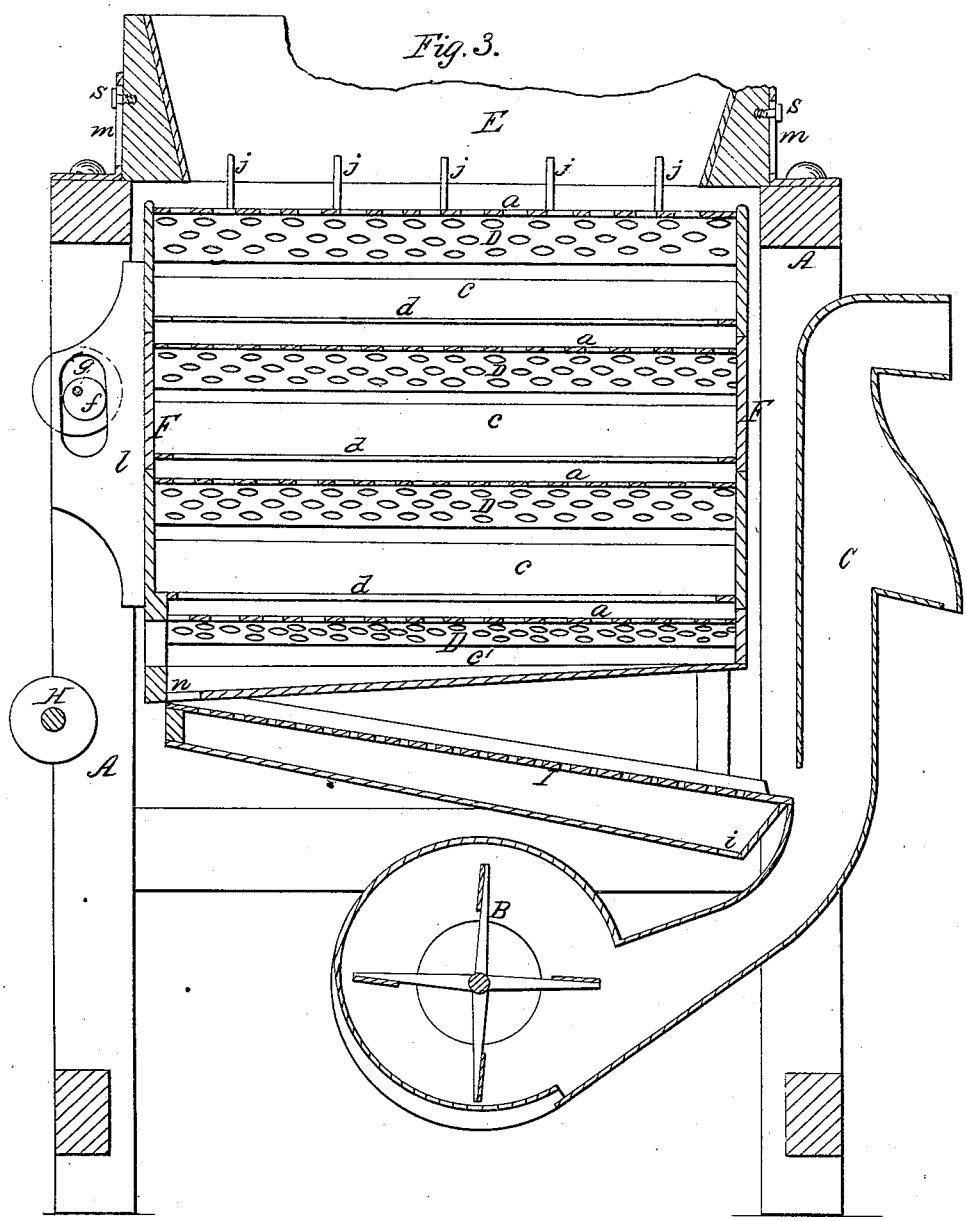

UNITED STATES PATENT OFFICE.

J. FARGUSSON, OF DUBUQUE, IOWA.

IMPROVEMENT IN GRAIN-SEPARATORS.

Specification forming part of Letters Patent No. 33,639, dated November 5, 1861.

*To all whom it may concern:*

Be it known that I, J. FARGUSSON, of Dubuque, in the county of Dubuque and State of Iowa, have invented a new and useful Improvement in Grain-Separators; and I do hereby declare that the following is a full, clear, and exact description of the same, reference being had to the accompanying drawings, forming part of this specification, in which—

Figure 1:
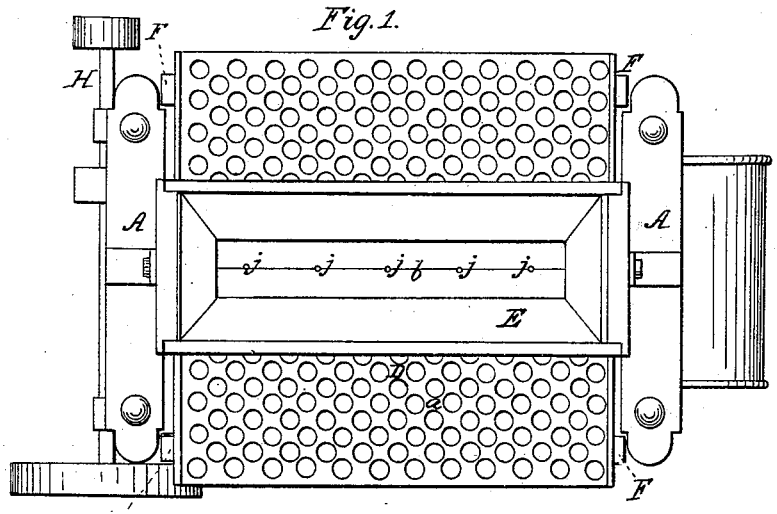
Figure 4:
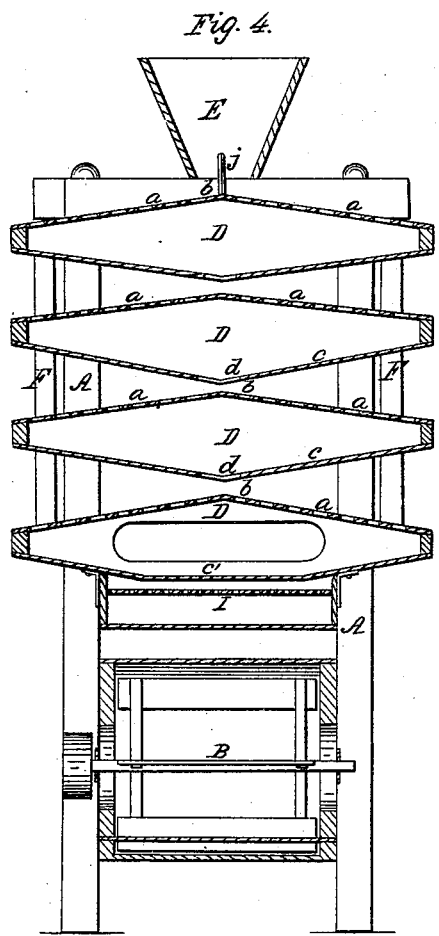

Figure 1 is a top view, Fig. 2 a side view, Fig. 3 a vertical longitudinal section, and Fig. 4 a transverse section, of my improved machine.

Similar letters of reference in each of the several figures indicate corresponding parts.

The nature of my invention consists in a hollow rhomboidal-shaped riddle, which has the central angular part of its top perforated plate closed along its whole length and the central angular part of its lower imperforated plate open along its whole length, substantially as hereinafter described; second, the combination of the described vibrating rhomboidal riddle, vertical pins projecting up from its closed central portion, and a bottomless hopper, substantially as hereinafter described; third, the combination of the described rhomboidal riddles, suspending-springs, and eccentric or equivalent vibrating device, substantially as hereinafter described; fourth, the combination of the described vibrating rhomboidal riddles and the cockle-riddle, substantially as hereinafter described; fifth, the combination of the vibrating rhomboidal riddles with a fan, substantially as hereinafter described; sixth, the adjusting of the hopper relatively to the upper rhomboidal riddle, in the manner hereinafter described.

My improved wheat-riddles divide the grain as it falls from the hopper and diffuse it laterally over two inclined perforated planes, and then again concentrate it, and so on until it is thoroughly cleaned. At each lateral diffusion of the grain it is deprived to a greater or less extent of oats and chaff, the same escaping over the lower edges of the riddle, while the grain or wheat passes through the perforations of the riddles. The adjustable hopper and pins regulate the feed very perfectly and the cockle-screen separates the small seed from the wheat, and the fan finishes the cleaning operation.

To enable others skilled in the art to make and use my invention, I will proceed to describe its construction and operation with reference to the drawings.

A represents a frame adapted for receiving and supporting a blast-fan B, blast-spout C, wheat-riddles D D, and hopper E, as shown.

The wheat-riddles D are in form of a rhomb or diamond in their transverse section, the upper, lower, and end pieces composing them being so shaped and disposed as to inclose a rhomboidal or diamond shaped space and to form an angle directly in the center of the top and bottom pieces. The top pieces $a$ of the riddles are closed at $b$, and perforated down to their edges on each side of the central closed portion $b$, as shown, thus presenting two riddle surfaces, one on each side of the center, and also an angle for dividing the wheat and diffusing it over said surfaces, and two inclined planes for temporarily supporting the grain in its descent over the inclined riddle surfaces, and in its passage through the perforations into the rhomboidal chambers. The bottom pieces $c$ of the wheat-riddles are open at the center of their width along their whole length, as shown at $d$, but are imperforated over the remainder of their surface. These bottom pieces are inverted with respect to the top pieces $a$, and therefore the wheat which enters the rhomboidal chambers is again concentrated by the two opposing incline planes of the lower pieces $c$. A series of these rhomboidal riddles is permanently arranged in a frame F, one above another, as shown, so that the wheat in passing from one riddle falls upon and enters another.

The frame F is suspended in the frame A on springs G, which allow a longitudinal movement of the frame and riddles together.

On one end of the frame F a slotted bracket $e$ is fastened, and in the slot of this bracket an eccentric $f$ revolves, the eccentric being on a revolving pulley-shaft $g$, which is geared by band or otherwise with the driving-shaft H. By thus arranging the riddles a reciprocating longitudinal motion is imparted to them when the machine is in operation.

It will be observed that the bottom piece $c'$ of the lowermost riddle is not made with an opening at the center of its width, but is made in the transverse section semi-elliptical in form, and has a transverse passage $n$ cut through it immediately at its back end. The object of this change is this—that the wheat in its last movement may descend over a large finely-reticulated riddle I, which is arranged directly between the fan and the last wheat-riddle, as shown, and thus be deprived of cockle and small seed.

It will be observed that the cockle-screen I runs into the fan-spout; also that the small seed and cockle escape from the cockle-riddle outside of the fan-case through a passage $i$ in the bottom piece of said riddle, while the wheat falls from the front end of the top piece of the cockle-riddle into the fan-case or spout.

The hopper E is made without a bottom and is arranged centrally in a longitudinal direction over the wheat-riddles—that is, the angle of the top piece of the riddles is directly under the center of the hopper. The hopper is supported at its ends by slotted brackets $m$ and set-screws $s$ in such manner that it can be set nearer to or farther from the riddles, and thus the feed increased or decreased at pleasure. The choking of the hopper is prevented by means of pins $j\,j$ projecting up into it from the top piece of the uppermost riddle, as represented.

In the drawings a blast-spout is shown combined with the fan-case, said spout having a shelf for retaining light grains, which rise with the chaff, and a passage for the escape thereof; but I do not wish to be understood as confining myself to the use of the rhomboidal riddles in connection with this particular character of fan and spout, as either a blast or suction fan may be used, and also any of the approved styles of vertical spouts.

It will be seen that my machine differs materially from riddles which diffuse the grain in only one direction; also that it differs from stationary angular plates, which alternately diffuse and concentrate the grain, and likewise that it differs very essentially from all contrivances in use in its discharging at the edges of each riddle without the aid of the blast of the fan such chaff, oats, &c., as are extracted or separated from the grain or wheat in its passage to the fan-case, and, finally, that the vibration of the pins through the grain in the hopper and the adjustability of the hopper relatively to said pins and the uppermost riddle for the purpose of regulating and controlling the feed differ from anything heretofore known in this class.

It may be proper to remark here that the wheat as it falls into the fan-case is met by a blast of air, and thus deprived of all dust and finer foreign matter, the foreign matter passing off through the vertical spout, and the wheat by reason of its superior gravity descending and escaping through a passage in the bottom of the fan-case, as is usual in such machines.

What I claim as my invention, and desire to secure by Letters Patent, is—

1. The wheat-riddles D, constructed and operating in the manner substantially herein described, for the purpose set forth.

2. The combination of the wheat-riddles D, pins $j$, and bottomless hopper E, substantially as and for the purpose described.

3. The combination of the wheat-riddles D, springs G, and eccentric $f$, substantially in the manner and for the purpose herein described.

4. The combination of the wheat-riddles D and the cockle-riddle I, substantially in the manner and for the purpose described.

5. The combination of the wheat-riddles D and fan B, substantially as and for the purpose described.

6. The adjustability of the hopper E relatively to the upper riddle D, substantially in the manner and for the purpose described.

J. FARGUSSON.

Witnesses:
MARK SANGLOP,
JOSEPH G. BULLOCK.